United States Patent [19]

Ermacora

[11] Patent Number: 4,610,128

[45] Date of Patent: Sep. 9, 1986

[54] FODDER CONDITIONING DEVICES

[75] Inventor: Rino Ermacora, Saverne, France

[73] Assignee: Kuhn, S.A., Saverne, France

[21] Appl. No.: 740,225

[22] Filed: Jun. 3, 1985

[30] Foreign Application Priority Data

Jun. 7, 1984 [FR] France ................................ 84 09095

[51] Int. Cl.$^4$ ...................... A01D 43/00; A01D 91/04
[52] U.S. Cl. .......................................... 56/16.4; 56/1
[58] Field of Search ............... 56/1, 16.5, 192, DIG. 1

[56] References Cited

FOREIGN PATENT DOCUMENTS

0086317 8/1983 European Pat. Off. .............. 56/192

Primary Examiner—Gene Mancene
Assistant Examiner—David I. Tarnoff
Attorney, Agent, or Firm—Marmorek, Guttman & Rubenstein

[57] ABSTRACT

A device for conditioning agricultural products, such as fodder, by generating sparks or electrical discharges at electrodes is disclosed. The device comprises at least one group of electrodes, said electrodes of said group being connected in parallel to each other, and an electrical control system connected to at least said one group of electrodes. The electrical control system supplies at any given moment to at least said one group of electrodes the voltage necessary to produce a spark or an electric discharge at at least one of the electrodes. In a preferred embodiment, the conditioning device is mounted on a tractor in advance of a cutting mechanism so that the agricultural product can pass through the conditioning device immediately prior to cutting.

29 Claims, 7 Drawing Figures

FODDER CONDITIONING DEVICES

BACKGROUND OF THE INVENTION

The present invention relates to a device for the conditioning of fodder, comprising a predetermined number of electrodes connected to an electrical control system and capable of creating a field of sparks and/or electric discharges through which the fodder passes.

Such a known device will, thanks to the electric sparks and/or electric discharges, condition the fodder with a view to reducing the duration of the drying period.

The advantage of this device vis-a-vis the devices known heretofore resides in the fact that the fodder is treated in a more gentle manner. For this reason, the losses in nutritive materials are less.

The systems for controlling the different electrodes which have been employed heretofore to equip the known conditioning device physically comprise a large range of devices. This substantially increases the price of the prior art conditioning device.

In addition, these systems include a large number of mechanical components which can lead to problems in reliability.

The object of the present invention is to equip such a conditioning device with a control system that is dependable while being less costly than prior art systems.

Accordingly, the control system of the present invention supplies at any given moment to at least one group of electrodes connected in parallel the voltage necessary to produce a spark or an electrical discharge, at least one of these electrodes producing a spark or an electrical discharge.

With the control system of the present invention, one significantly reduces the quantity of the means necessary to control the electrodes and one suppresses particularly the mechanical parts that are needed to control the electrodes, thus achieving the desired objects.

According to an additional feature of the invention, the control system supplies several times per period, to at least one group of electrodes connected in parallel, the voltage needed to produce a spark or an electric discharge.

This group of electrodes connected in parallel is thus subjected a substantial number of times to the voltage needed to produce a spark or an electric discharge. The spark or electric discharge originates in that electrode in the group which at the time the voltage is applied offers the least resistance to the mentioned spark or electric discharge.

As a whole, one obtains a good conditioning of the fodder.

Other features and advantages of the invention will be made clear by the following description of a preferred embodiment which has been illustrated in the drawing. However said preferred embodiment is not intended to limit the scope of the invention.

DETAILED DESCRIPTION OF A PREFERRED EMBODIMENT

Figure 1:
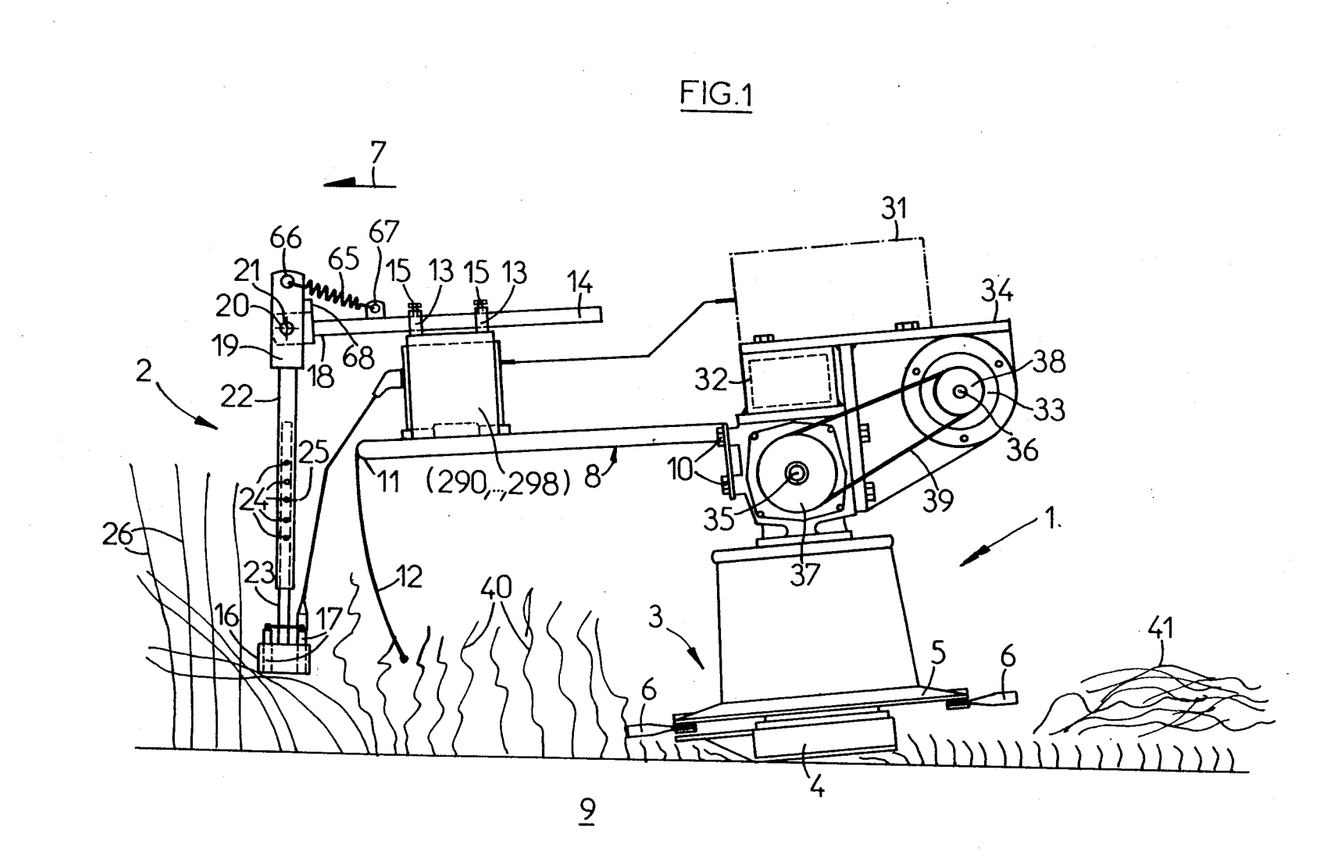
FIG. 1 shows a side view of a conditioning device according to the invention installed on a mower.
Figure 2:
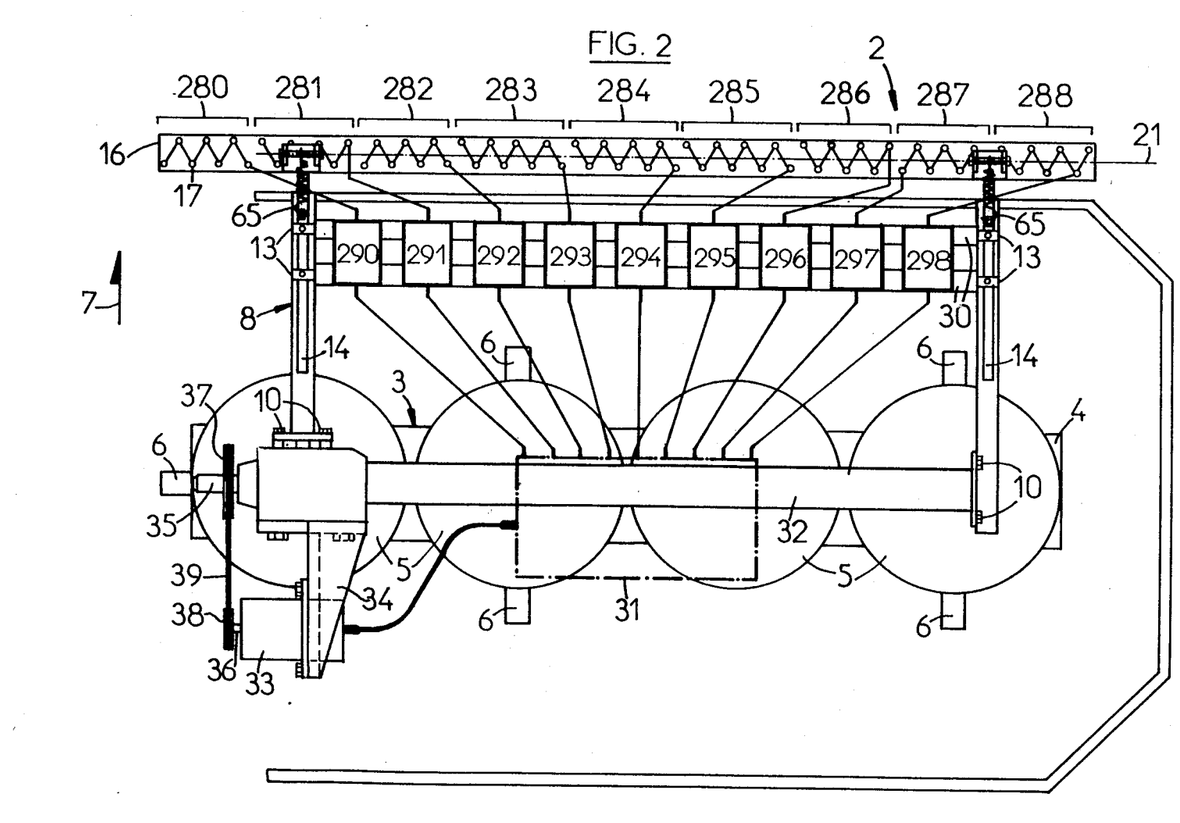
FIG. 2 represents a top view of the machine of FIG. 1.

FIGS. 1 and 2 illustrate schematically a machine according to the present invention which comprises a mower (1) and a fodder conditioning device (2). The mower (1) comprises essentially a cutting mechanism (3) which includes a casing (4) on which are mounted rotating supports (5) provided with cutting tools (6). It is understood that one will not depart from the spirit of the invention if the cutting mechanism (3) is of another nature.

In front of the cutting mechanism (3), taking into consideration the advancing direction shown by the arrow (7) during work, there extends the conditioning mechanism (2). This conditioning mechanism (2) is, in this example, supported by the framework (32) situated above the cutting mechanism (3), with the aid of a structure (8). The structure (8) extends at a certain distance above the soil (9), being affixed to the framework (32), for example, by means of screws (10). At its free end (11), a protective cloth (12) is attached to structure (8) and dangles freely downwards. This cloth (12) serves to check or stop the hurling of bodies that may be produced by the rotating supports (5) or the cutting tools (6). The structure (8) supports two pairs of bearings (13) which are disposed at a certain distance from each other. Across each pair of bearings (13), there extends a shaft 14 which has the capacity to slide along its axis through bearings (13) in a longitudinal direction, which axis extends substantially parallel to the direction of advancement (7). The sliding of the shafts (14) in the bearings (13) may, for example, be blocked by means of screws (15).

In front, taking into consideration the advancing direction (7), the shafts (14) support the bar (16) that bears the electrodes (17). Linkage between the bar (16) and the shafts (14) is accomplished in the following way.

The front end (18) of each of shafts (14) extends between the flanges of a fork (19), being connected to the same by means of an axle (20). The two axles (20) define a pivoting axis (21) which is transverse to the advancing direction (7). Each fork (19) is connected to the end of a tube (22) that extends downwards, and into which there is inserted a shaft (23) affixed to bar (16). The tubes (22) have a plurality of openings (24), into one of which there is thrust a pin (25) that also traverses an opening arranged in the corresponding shaft (23).

A spring (65) causes the bar (16) to pivot about axis (21) in the direction of advance (7). For this purpose, the forks (19) and the shafts (14) have hooks (66, 67) respectively, into which the spring (65) is fastened. Pivoting of the bar (16) in the direction of the arrow (7) is restricted by a stop (68).

In this way, the optimum position of the bar (16) bearing the electrodes (17) corresponding to predetermined working conditions can easily be regulated. In effect, thanks to the bearings (13), the bar (16) may be adjusted for various distances from the cutting mechanism (3). Equally, thanks to the openings (24) arranged in tubes (22), bar (16) may be adjusted for various distances to the surface of the soil (9).

Since the bar (16) can pivot backwards against the tension of the spring (65), it can accordingly mitigate the effects in case of a collision with an obstacle which it might meet while working.

The function of the electrodes (17) is to produce sparks or electric discharges on the non-cut fodder (26) with a view to accelerating its drying after cutting by the cutting tools (6). The soil (9) represents the ground. In FIG. 2 one can see that the electrodes (17) are connected in groups of electrodes (280, 281, . . . , 288). The electrodes (17) of each group (280, 281, . . . , 288) are connected in parallel. Each group (280, 281, . . . , 288) is connected to a coil (290, 291, . . . , 298) or to any other equivalent system capable of producing sufficient voltage in order to produce a spark at one of the electrodes (17). The coils (290, 291, . . . , 298) are carried by the structure (8) which, to this effect, is equipped with a cross-piece (30) onto which the coils (290, 281, . . . , 298) may, for example, be bolted.

The coils (290, 291, . . . , 298) are fed by an electric box (31) affixed to the structure (32) of the machine. The contents of the electric box (31) will be described in more detail a little further on. This electric box (31) is fed electric current by an alternator (33) affixed to the machine by means of a support (34). The alternator (33) is operated by a drive shaft (35) which itself is driven by another driving source which may, for example, be the agricultural tractor (not illustrated) that drives the machine. The drive shaft (35) may also transmit rotary movement to the cutting mechanism (3). The manner in which the drive shaft (35) may be driven by the driving source is well known to those of ordinary skill in the art. The connection between the drive shaft (35) and the shaft (36) of the alternator (33) is made by means of a transmission mechanism such as, for example, pulleys (37, 38) and belt (39).

The machine that has just been described operates in the following way. During work, a tractive source, such as, for example, an agricultural tractor, displaces the machine in the direction of arrow (7). The tractive source which may, at the same time, comprise a driving source such as the Power Take off of a tractor, sets into rotation the drive shaft (35). The drive shaft (35) transmits motion to cutting mechanism (3) and to alternator (33). Rotation of the shaft (36) of alternator (33) generates the electric current necessary for the electric box (31). The electric system that is housed in the electric box (31) controls the various coils (290, 291, . . . , 298) connected to the groups of electrodes (280, 281, . . . , 288) which produce sparks and/or electric discharges in the fodder (26). The conditioned fodder (4) is thereafter cut by the cutting mechanism (3), being then deposited in a swath (41) behind the cutting mechanism (3) where it will dry thanks to the action of the sun and the wind.

In the example described, the conditioning of the fodder takes place before the cutting of the fodder. It is understood that one will not depart from the spirit of the invention if conditioning of the fodder is effected after cutting.

FIGS. 3 to 7 show the electric system housed in the interior of the electric box (31).

Figure 3:
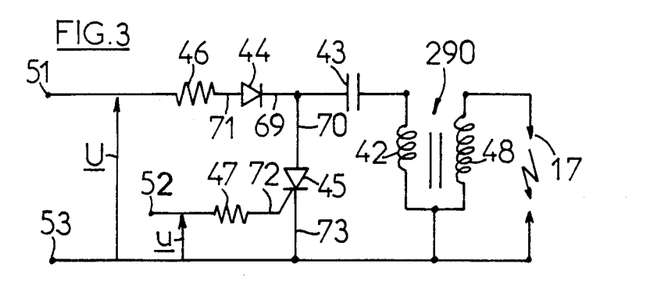
FIG. 3 shows a circuit diagram of the basic principle of the control system used on the machine illustrated in FIGS. 1 and 2.

FIG. 3 illustrates the basic principle. The primary (42) of a coil (290) for example, is connected to a terminal wire of a capacitor (43) or to any equivalent system. The other terminal wire of this capacitor (43) is connected, on the one hand, to the cathode (69) of a diode (44) or another equivalent system, and, on the other hand, to the anode (70) of a thyristor (45) or another equivalent system. Anode (71) of diode (44) is branched to one of the ends of a resistance (46). One applies to the free end (51) of resistance (46) a voltage U. The function of resistance (46) is to protect the diode (44). As concerns the thyristor (45), its trigger (72) is branched to one of the terminal wires of a control resistance (47), to whose free end (52) one applies a voltage u. Cathode (73) of thyristor (45) is branched to the terminal wire (53) which represents the ground. The voltages U and u are dephased by a value equal to $\pi$, the value of voltage U being greater than that of voltage u.

The circuit functions in the following way. During generation of AC current by the alternator, when the diode (44) is conducting, the capacitor (43) becomes charged. Since voltage u is dephased in relation to voltage U, the thyristor (45) is blocked. At the end of the phase during which the diode (44) is conducting, this diode becomes blocked. At the end of a period whose duration depends on the value of the control resistance (47), the thyristor (45) becomes conducting and capacitor (43) is then abruptly discharged into the primary (42) of coil (290). This has the effect of creating in the secondary (48) of coil (290) the voltage necessary to produce a spark in the electrode (17).

As described above, the thyristor (45) only becomes conducting at the end of a certain period whose length depends on the value of the control resistance (47). It is thus possible to discharge several capacitors into the same coil at different moments. This is what FIG. 4 illustrates.

In this figure, one sees five capacitors (431, . . . , 435) all connected to one terminal wire which is connected to the primary (42) of a coil (290). The other terminal wire of each capacitor (431, . . . , 435) is connected, on the one hand, to the cathode of its respective diode (441, . . . , 445) and, on the other hand, to the anode of its respective thyristor (451, . . . , 455). The anode of each diode (441, . . . , 445) is connected to the terminal wire of its corresponding resistance (461, . . . , 465). The other terminal wires of the resistances (461, . . . , 465) are all connected at point (51), to which one applies a voltage U.

The trigger of each thyristor (451, . . . , 455) is connected to one of the terminal wires of its respective control resistance (471, . . . , 475), and one applies to the other terminal wire of the control resistances, all connected at point (52), a voltage u de-phased in relation to voltage U and of a lower value than the latter one. The cathodes of the different thyristors (451, . . . , 455) are connected to the terminal (53) which represents the ground. The value of each of the various control resistances (471, . . . , 475) is different.

Figure 4:
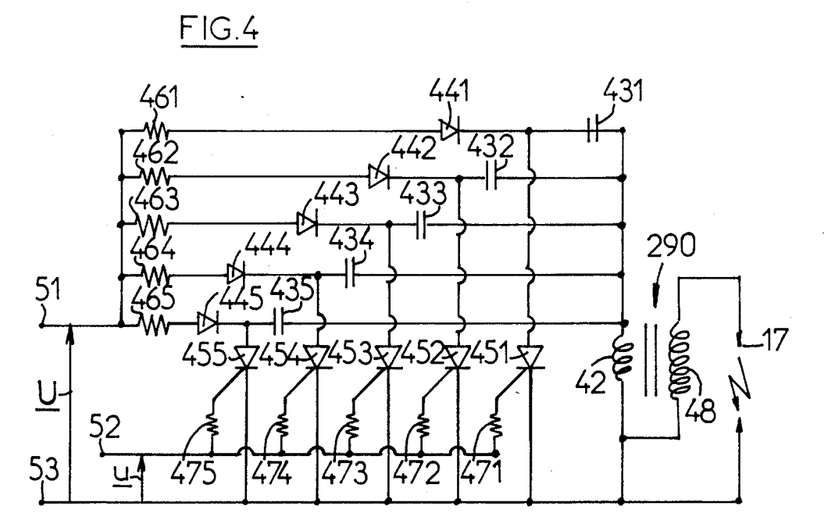
FIG. 4 shows a circuit diagram that uses the basic plan of FIG. 3, and which allows multiplication of the number of sparks or electric discharges.

One can thus see that the circuit represented in FIG. 4 comprises five primary circuits such as they have been represented in FIG. 3, but where the value of the control resistance (47) differs from one circuit to the other.

The circuit illustrated in FIG. 4 operates in the following way. During generation of AC current by the alternator, when the diodes (441, . . . , 445) are conducting, one charges the capacitors (431, ..., 435). Since voltage u is de-phased in relation to voltage U, the thyristors (451, ..., 455) are blocked. At the end of the phase during which the diodes (441, ..., 445) are conducting, they become blocked. Starting from this moment, there arise the following events. At the end of a certain period, the first thyristor (451) becomes conducting while the other thyristors (452, ..., 455) are still blocked since the values of their control resistances (472, ..., 475) differ from that of the control resistance (471) of the thyristor (451). The first capacitor (431) then is discharged into the primary (42) of coil (290), creating at the seconday (48) the necessary voltage to produce a spark in electrode (17). After this cycle, the second thyristor (452) becomes conducting while thyristors (453, ..., 455) are still blocked. The second capacitor (432) then is discharged into the primary (42) of the coil (290), creating also at the secondary (48) the necessary voltage for producing another spark in electrode (17). Thereafter the same cycle will successively be produced regarding thyristors (453, 454, 455).

It can thus be seen that with this arrangement one succeeds in producing five sparks during one AC current period.

The values of the control resistances (471, ..., 475) should, therefore, not be close to one another. In this way, one effectively obtains distinct sparks. In practice, it has been found that the system operated in a satisfactory manner with five discharges of the capacitors during one period of an alternating current of 50 Hertz.

Figure 5:
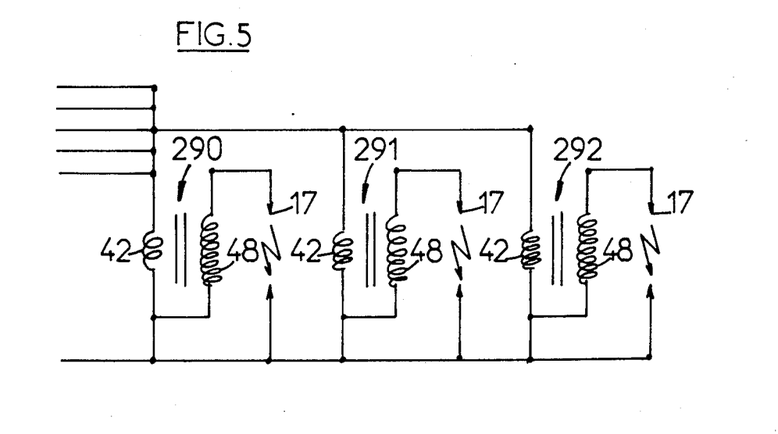
FIG. 5 shows a circuit diagram utilizing the plan of FIG. 4, and which shows an additional form of multiplying the number of sparks or electric discharges.

FIG. 5 shows that one can connect several coils in parallel. In practice, it has been found that satisfactory results were obtained with three coils (290, 291, 292). Each capacitor (431, ..., 435) thus discharges at the same time into the three coils (290, 291, 292) connected in parallel. With this arrangement, it is therefore possible to produce in a satisfactory manner fifteen sparks per period from an alternating current of 50 Hertz.

Additionally, it is possible to charge several capacitors from one and the same diode. In addition, it is possible to control the discharge of several capacitors with the same thyristor.

Figure 6:
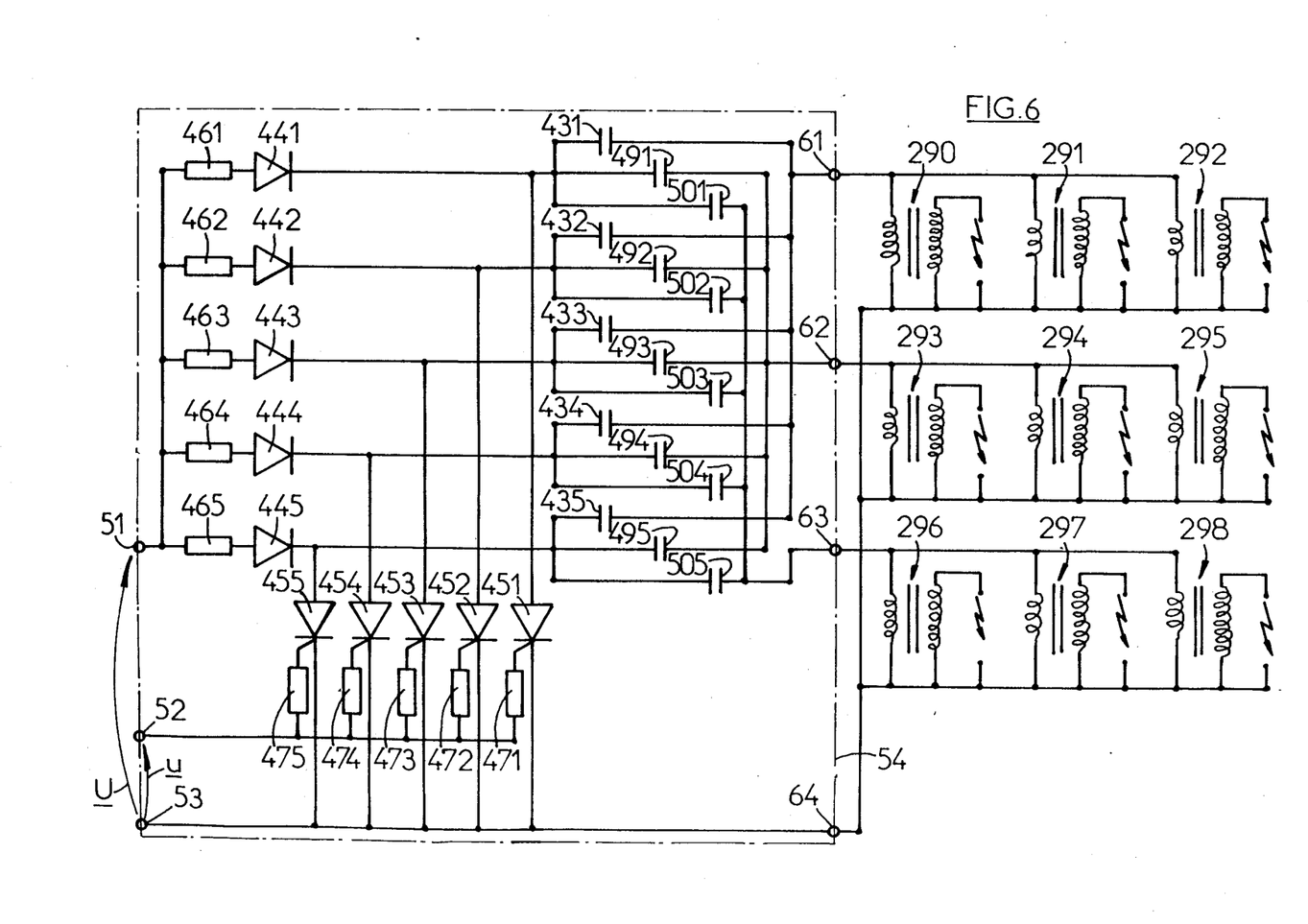
FIG. 6 shows a circuit diagram utilizing the arrangement illustrated in FIGS. 4 and 5 and showing an additional way of multiplying the number of sparks or electric discharges.

In FIG. 6 each diode (441, ..., 445) simultaneously charges its respective group of three capacitors ((431, 491, 501), ..., (435, 495, 505)). In a similar manner, each thyristor (451, ..., 455) controls the simultaneous discharge of the same group of three capacitors ((431, 491, 501), ..., (435, 495, 505)). The first capacitors (431, .., 435) of the different groups are discharged in a first ensemble of three coils (290, 291, 292) connected in parallel, the second capacitors (491, ..., 495) of the different groups are discharged into a second ensemble of three coils (293, 294, 295) connected in parallel, and the third capacitors (501, ..., 505) of the different groups are discharged into a third ensemble of three coils (296, 297, 298) connected in parallel. In this way, each thyristor (451, ..., 455) can control the simultaneous generation of nine sparks. Due to the fact that cell (54) contains five thyristors, one is able to generate forty-five sparks per period from an alternating current of 50 Hertz.

Figure 7:
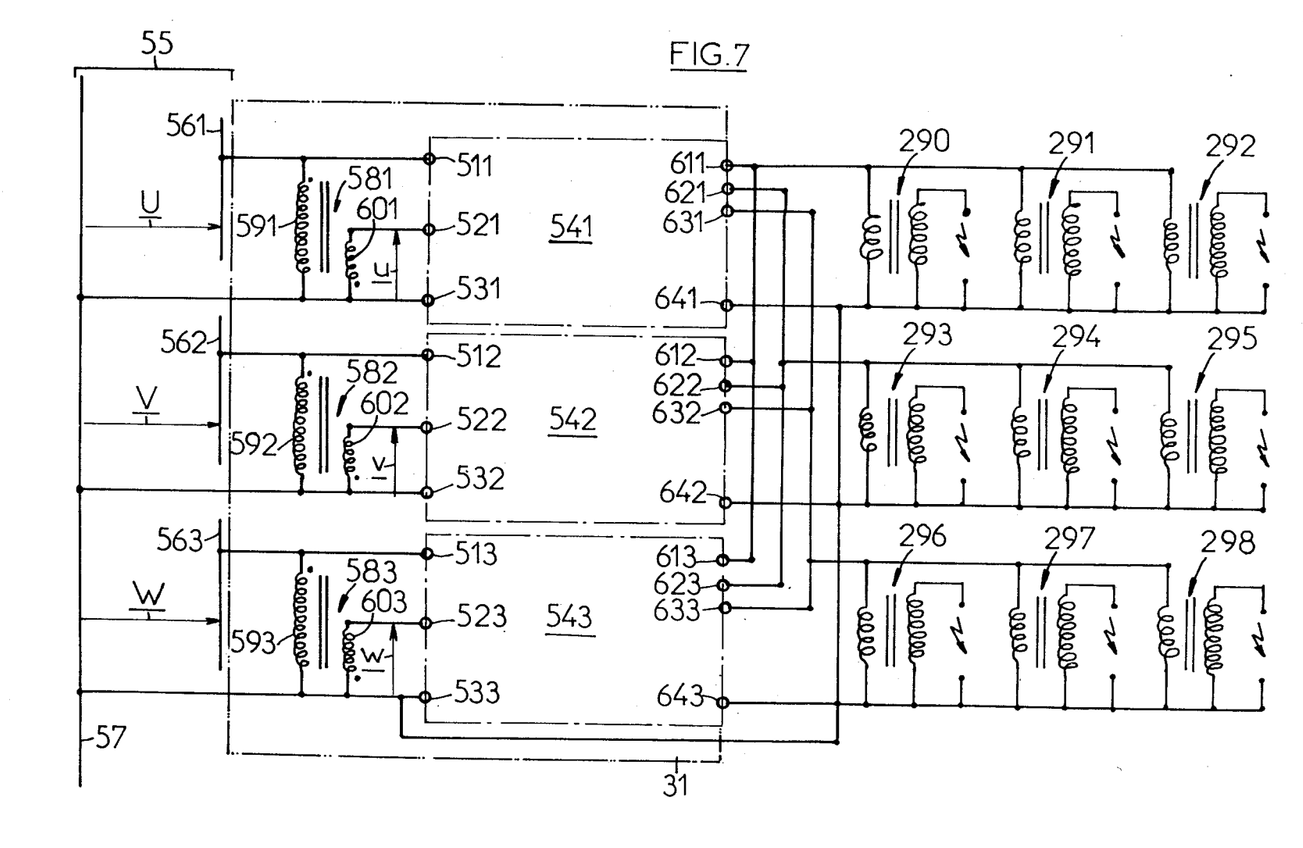
FIG. 7 shows a circuit diagram using the arrangement of FIG. 6, and showing yet another way to multiply the number of sparks or electric discharges.

FIG. 7 shows the complete electric system which is housed in the electric box (31) of FIGS. 1 and 2. This electric system comprises three cells (541, 542, 543) similar to that shown as cell (54) in FIG. 6. The electric system is supplied by a tri-phased source of electricity (55). Each cell (541, 542, 543) is supplied with a phase (561, 562, 563), which has a feeding terminal wire (511) of cell (541) for phase (561), terminal wire (512) of cell (542) for phase (562), and terminal wire (513) of cell (543) for phase (563). The terminal wires (531, 532, 533) of cells (541, 542, 543) are connected to terminal wire (57) which represents the ground. In order to apply to each terminal wire (521, 522, 523) a voltage of a smaller value and de-phased by $\pi$ in relation to the voltage that is applied to the terminal wires (511, 512, 513), there are provided de-phasing transformers (581, 582, 583). The primaries (591, 592, 593) of the de-phasing transformers (581, 582, 583) are branched on phases (561, 562, 563) which feed the corresponding cells (541, 542, 543), while the secondaries (601, 602, 603) of the de-phasing transformers (581, 582, 583) are branched on the terminal wires (521, 522, 523) of the corresponding cells (541, 542, 543).

Each cell (541, 542, 543) oomprises four terminal outlets ((611, 621, 631, 641), ..., (613, 623, 633, 643)). The terminals (611, 612, 613) feed the first ensemble of three coils (290, 291, 292), the terminals (621, 622, 623) feed the second ensemble of coils (293, 294, 295) and the terminal wires (631, 632, 633) feed the third ensemble of coils (296, 297, 298). Terminal wires (641, 642, 643) constitute the mass and are thus connected to the same mass of the coils (290, ..., 298).

With this arrangement, one is thus able to generate one hundred and thirty-five sparks during one period while employing a minimum of components.

In effect, this is made possible because the three phases (561, 562, 563) are de-phased relative to each other. Thus, while one is charging the capacitors of two cells, the capacitors of the third cell are being discharged into the coils (290, ..., 298).

The secondary (48) of each coil (290, ..., 298) feeds a group of several electrodes (17) branched in parallel. In the interior of one group of electrodes, the spark or the electric discharge is produced at the electrode which at the moment of applying the voltage offers the least resistance to the spark or to the electric discharge. Overall, with the uncertain distribution of sparks at the different electrodes, one is able to obtain a good conditioning of the fodder with a restricted number of means.

In this fashion, the cost of the electric system remains moderate.

In the example that has been described, each group of capacitors comprises three capacitors. One will not depart from the invention if the groups comprise more or less than three capacitors. Likewise, the number of capacitors per group may differ from one group to the other.

Additionally, in the example, each capacitor of a particular group is simultaneously discharged into an ensemble of three coils arranged in parallel.

One will not depart from the scope of the invention if one or several or all of the capacitors of a particular group are discharged into several ensembles of coils arranged in parallel.

Furthermore, the ensembles of coils may comprise more or less than three coils in parallel.

Equally, the number of thyristors per cell may be less or more than five.

Finally, improvements or modifications may be introduced in the present invention without departing from its scope.

I claim:

1. An agricultural conditioning device for producing a field of electrical discharges through which an agricultural product passes as the conditioning machine moves along the ground, said conditioning device comprising:

at least one group of electrodes connected to each other in parallel and an electrical control system adapted to receive an alternating current signal and to discharge said electrodes a predetermined number of times within each period of said alternating current signal so that the field of electrical discharges comprises sparks produced at a controlled rate, said electrical control system comprising capacitance means that is sequentially discharged during each period of said alternating current signal to generate a sequence of voltages, each of which cause a discharge of at least one of said electrodes.

2. Device according to claim 1, wherein said electrical control system supplies several times per period to at least said one group of electrodes the voltage necessary for producing a spark or an electric discharge.

3. Device according to claim 1, wherein said electrical control system includes a plurality of capacitors which successively discharge into a coil connected to said one group of electrodes, said coil being capable of generating sufficient voltage to produce a spark or an electric discharge at one of said electrodes.

4. Device according to claim 3, wherein said capacitors are charged during one phase of AC current generation and are discharged during the succeeding phase of AC current generation.

5. Device according to claim 3, further comprising diodes connected to said capacitors, said capacitors being charged by said diodes.

6. Device according to claim 5, wherein each diode charges a plurality of capacitors.

7. Device according to claim 6, wherein each diode simultaneously charges a group of said capacitors.

8. Device according to claim 3, further comprising thyristors connected to said capacitors and control resistors connected to said thyristors, said thyristors controlling the successive discharge of said capacitors and said control resistors controlling the opening of said thyristors.

9. Device according to claim 8, wherein each thyristor controls the discharge of a plurality of said capacitors.

10. Device according to claim 9, wherein each thyristor controls the simultaneous discharge of a group of said capacitors.

11. Device according to claim 8, wherein said electrical control system comprises at least one cell, said cell having in preference up to five thyristors when the frequency of the AC current in said cell is 50 Hertz.

12. Device according to claim 3, wherein each capacitor discharges into an ensemble of a plurality of coils connected in parallel.

13. Device according to claim 12, wherein each capacitor discharges into an ensemble of three coils connected in parallel.

14. Device according to claim 3, wherein said electrical control system comprises groups of capacitors, said groups of capacitors discharging successively into a plurality of ensembles of coils connected in parallel.

15. Device according to claim 14, wherein each capacitor in each group of capacitors discharges into at least one ensemble of coils connected in parallel.

16. Device according to claim 3, wherein said electrical control system comprises a plurality of cells, each of said cells having capacitors charged by diodes then discharged by thyristors, said cells discharging successively into a group of ensembles of coils connected in parallel, each of said cells being supplied by a phase of multiphase current, each of said phases being out of phase with each other.

17. An agricultural product cutting and conditioning machine including a device for cutting said agricultural product and a device for conditioning said agricultural product, said conditioning device being adapted to produce a field of sparks through which the agricultural product passes as the machine moves along the ground, said conditioning device comprising:

at least one group of electrodes connected together in parallel and an electrical control system adapted to receive an alternating current signal and to discharge said electrodes a predetermined number of times within each period of said alternating current signal, so that the field of electrical discharges comprises sparks produced at a controlled rate, said electrical control system comprising a plurality of capacitance devices which are sequentially discharged during each period of said alternating current signal to produce a sequence of voltages, each of which causes a discharge of at least one of said electrodes, said electrodes and said electrical control system being attached to said cutting device and said machine being adapted for forward movement.

18. Machine according to claim 17, wherein said electrodes are disposed in front of said cutting device.

19. Machine according to claim 18, wherein said agricultural product is conditioned prior to being cut by said cutting mechanism.

20. Machine according to claim 17, wherein said electrodes are mounted on a support whose location relative to the soil can be adjusted.

21. Machine according to claim 17, wherein said electrodes are mounted on a support whose location relative to said cutting mechanism can be adjusted.

22. Machine according to claim 17, wherein said electrodes are mounted on a support, said support being rotatable about an axis that extends transversally to the forward direction of said machine, said axis being higher off the soil than said support.

23. Machine according to claim 22, wherein said support is rotatable about said axis in a direction opposite to that of the forward direction; and against a spring means.

24. Machine according to claim 22, wherein rotation of said support about said axis in the forward direction is restricted by a stopping means.

25. Machine according to claim 17, further comprising an alternator connected to said electrical control system for generating said alternating current signal.

26. Machine according to claim 25, further comprising transmission means for driving the cutting device, and wherein said alternator is driven by said transmission means of the cutting device.

27. An agricultural conditioning device for producing a field of electrical discharges through which an agricultural product passes as the conditioning machine moves along the ground, said conditioning device comprising:

at least one group of electrodes connected together in parallel and an electrical control system adapted to receive an alternating current signal and to discharge said electrodes a predetermined number of times within each period of said alternating current signal, so that the field of electrical discharges comprises sparks produced at a controlled rate, said electrical control system comprising a plurality of capacitance devices which are sequentially discharged during each period of said alternating current signal to produce a sequence of voltages, each of which cause a discharge of at least one of said electrodes.

28. An agricultural conditioning device for producing a field of electrical discharges through which an agricultural product passes as the conditioning machine moves along the ground, said conditioning device comprising:

at least one group of electrodes and an electrical control system adapted to receive an alternating current signal and to discharge said electrodes a predetermined number of times within each period of said alternating current signal so that the field of electrical discharges comprises sparks produced at a controlled rate, said electrical control system comprising capacitance means that is sequentially discharged during each period of said alternating current signal to generate a sequence of voltages, each of which cause a discharge of at least one of said electrodes.

29. An agricultural conditioning device for producing a field of electrical discharges through which an agricultural product passes as the conditioning machine moves along the ground, said conditioning machine comprising:

at least one group of electrodes and an electrical control system adapted to receive an alternating current signal and to discharge said electrodes a predetermined number of times within each period of said alternating current signal so that the field of electrical discharges comprises sparks produced at a controlled rate, said electrical control system comprising a plurality of capacitance devices which are sequentially discharged during each period of said alternating current signal to produce a sequence of voltages, each of which cause a discharge of at least one of said electrodes.

* * * * *